United States Patent Office 3,342,898
Patented Sept. 19, 1967

3,342,898
COMPOSITION AND PROCESS
Frank F. Roselli, San Mateo, Calif., assignor to Diamond Alkali Company, Cleveland, Ohio, a corporation of Delaware
No Drawing. Filed May 13, 1963, Ser. No. 280,138
3 Claims. (Cl. 260—867)

This invention relates to improved synthetic resins, and, more particularly, to curable polyester resins characterized by improved physical properties and a high degree of fire-resistance.

One of the chief obstacles to the expansion of the synthetic resin industry has been the flammability of the great majority of these resins. To eliminate this disadvantage, a wide variety of fireproofing additives have been developed. Most of these additives contain one or more of a number of elements noted for their fireproofing properties; these elements include bromine, chlorine, phosphorous and antimony.

In general, fireproofing additives are of two varieties. The first variety is incorporated into the resin as a non-reactive "filler" component, and the second variety reacts with the resin in some way to become part of its molecular structure. This invention is concerned with the first variety, or "filler" additive.

Fireproofing additives of the "filler" type described in the prior art often have adverse effects on the properties of the resins in which they are used. When one of these additives is incorporated into a solution of an unsaturated polyester in a liquid monovinyl aromatic compound, it will "separate" or precipitate during the subsequent curing process, thus altering the light-transmitting properties of the cured resin. This property is particularly undesirable in a transparent resin. The additive may also have an adverse effect on the physical strength and hardness of the resin. Finally, it may have a tendency to "migrate" to the surface of the resin and undergo hydrolysis when it comes in contact with moist air, thus causing a loss of fire-resistance in the resin as a whole.

A few prior-art additives have been developed which do not have adverse effects on the resin properties when used in low concentrations; e.g., not more than 10 percent by weight. However, at higher concentrations they also decrease the quality of the resin.

A principal object of this invention, therefore, is to provide fireproofing additives for curable polyester resins which do not have undesirable effects on the resin properties.

Another object is to provide fireproofing additives which can be used in higher concentrations than those of the prior art.

A further object is the provision of novel compounds useful as fireproofing additives.

Another object is to provide fire-resistant, curable polyesters which may be cured to transparent resins.

Still another object is to provide cross-linked fire-resistant polyester resins with improved strength, hardness and transparency.

These and other objects are attained by this invention which comprises novel curable, fire-resistant polyester compositions; fire-resistant, cross-linked polyester resins, and methods for their preparation.

The novel fire-resistant, curable polyester compositions of this invention comprise: (A) about 30–83 percent, by weight, of the reaction product of (1) about 2.0 to 2.5 molar parts of at least one aliphatic polyhydroxy compound, (2) about .4 to 2.0 molar parts of a compound selected from the group consisting of dibasic carboxylic acids containing a polymerizable double bond and anhydrides thereof, and (3) about 0 to 1.6 molar parts of a compound selected from the group consisting of non-polymerizable dibasic carboxylic acids and anhydrides thereof; (B) about 15 to 68%, by weight, of a solvent for said reaction product, said solvent comprising a monovinyl aromatic compound; and (C) as a fire-retardant additive, about 2 to 30 percent, by weight, of a compound selected from the group consisting of (a) compounds of the formula $(RO)_nM$, whereien M is selected from the group consisting of boron, silicon, titanium, arsenic, tin, lead and bismuth; R is a vicinal dihaloalkyl group wherein the atomic weight of the halogen is between 35 and 80, inclusive; and $n$ is an integer from 3 to 4, inclusive; and (b) compounds of the formula $(R^1O)_3Sb$, wherein $R^1$ is a vicinal dibromoalkyl group.

As used in the specification and claims, the term "vicinal dihaloalkyl group" is defined as an alkyl group containing two halogen atoms attached to adjacent carbon atoms.

Illustrative of the compounds which may be used as fire-retardant additives according to this invention are the following:

Tris(2,3-dibromopropyl) antimonite $$Sb(OCH_2CHBrCH_2Br)_3$$

Tris(2,3-dibromopropyl) borate $$B(OCH_2CHBrCH_2Br)_3$$

Tetrakis(2,3-dibromopropyl) silicate $$Si(OCH_2CHBrCH_2Br)_4$$

Tetrakis(2,3-dichloropropyl) silicate $$Si(OCH_2CHClCH_2Cl)_4$$

The fire-retardant additives of this invention may be prepared by the reaction of chlorine or bromine with the corresponding alkenyl ester. For example, tris(2,3-dibromopropyl) antimonite is prepared by reacting triallyl antimonite with bromine. The alkenyl ester starting material is conveniently prepared by reacting the corresponding alcohol with the metal halide, e.g., $SbCl_3$, $SiCl_4$, preferably in the presence of a "scavenger" such as ammonia or an amine; or by reacting said alcohol with the oxyacid of the metal, e.g., $H_3BO_3$.

The halogenation reaction is desirably, but not necessarily, carried out in an inert solvent; halogenated solvents such as carbon tetrachloride, chloroform, methylene chloride, and the like are preferred. Reaction temperatures between about $-30°$ C. and $+25°$ C. are satisfactory; the preferred temperature range is from about $-15°$ C. to about $+10°$ C. At least the stoichiometric amount of halogen is used.

Alternately, the additives may be prepared by first halogenating the allyl alcohol to the corresponding dibromo or dichloro propanol and subsequently reacting the dihalo alcohols with the inorganic halide as before, e.g., $SbCl_3$, $SiCl_4$, etc., or with the oxyacid, e.g., $H_3BO_3$.

The compounds may often be purified by distillation if desired; however, purification is generally not necessary if the compound is to be used as a fireproofing additive. Many of these compounds are high-boiling and viscous and, therefore, very hard to distill.

The polyesters used in this invention are prepared from at least one aliphatic polyhydroxy compound and a mixture of a dibasic carboxylic acid containing a polymerizable double bond and a non-polymerizable dibasic carboxylic acid. Among the polyhydroxy compounds which may be used are ethylene glycol, propylene glycol, glycerol, and the like. Suitable polymerizable acids include maleic, fumaric, itaconic and citraconic acids, and the like; the non-polymerizable acid may be, for example, phthalic, isophthalic, terephthalic, succinic or adipic acid or substituted derivatives thereof.

The role of the polymerizable acid in the resin mix is, of course, to provide sites for cross-linking. The formed polyester is generally dissolved in a cross-linking agent, usually a monovinyl aromatic compound such as styrene, methylstyrene, vinylpyridine or substituted derivatives thereof. When reaction between the polyester and the cross-linking agent is initiated (for example, by adding a free radical initiator such as benzoyl peroxide), there results a tough, infusible resin.

According to the preferred mode of carrying out this invention, a mixture of polymerizable and non-polymerizable dibasic carboxylic acids or anhydrides thereof, as described hereinabove, is esterified with an aliphatic polyhydroxy compound. The two acids are ordinarily used in approximately equimolar amounts, although an excess of either may be used if desired. In order to provide each polyester chain with terminal hydroxy groups, enough polyhydroxy compound is usually employed to provide an excess of about 10 to 25% over the stoichiometric amount. Alternatively, an excess of acid may be used and the carboxy-terminated polyester may be "capped" with a suitable monohydroxy alcohol, e.g., dibromopropanol.

The polyester formed by the above method is dissolved in the monovinyl aromatic compound, the amount of polyester in the solution usually being about 60 to 70% by weight. To this solution is added the fireproofing agent, in an amount sufficient to constitute about 2 to 30%, by weight, preferably about 5 to 10%, by weight, of the final mixture. When curing is to be effected, a small amount, e.g., about 0.5 to 1.5% by weight, of a free radical polymerization catalyst (or combination of catalysts) is added and the mass is heated to the temperature necessary for cross-linking.

The flame retardant resins of this invention by means of incorporation of suitable promoters and accelerators for instance cobalt naphthenate and dimethyl aniline are capable of rapid curing at room temperature without loss of properties.

The polyesters of this invention are transparent; their strength is comparable to that of untreated resins; and the effect of water or other solvents on their properties is negligible. These properties are found even in resins containing high percentages of additive. In this respect they are markedly superior to resins containing prior art antimony-containing additives of the filler type.

The following examples are given in order that those skilled in the art may achieve a fuller understanding of the invention and the preferred means for effecting the same. All parts and percentages are by weight.

EXAMPLE 1

*Preparation of triallyl antimonite*

In a two-liter, three-necked flask equipped with mechanical stirrer, reflux condenser, thermometer, drying tube and gas inlet, is placed 228 g. (one mole) of anhydrous antimony trichloride crystals dissolved in 1000 ml. of benzene. To this solution, while stirring vigorously, is rapidly added 255 g. (4.4 moles) of allyl alcohol. The temperature of the reaction mixture is maintained at about 5° C. by means of an ice water bath. A gentle stream of anhydrous ammonia gas is introduced under the surface of the solution. A white precipitate of antimonyamine complex starts separating as a fine suspension while the flask temperature is maintained at less than 10° C. As an excess of ammonia is ascertained by the color change of a piece of litmus paper held on top of the reflux condenser, its flow into the flask is discontinued. The temperature is then raised to 79° C., the reflux temperature of the benzene solution, and this temperature is kept constant for six hours, during which period abundant quantities of ammonia gas are evolved and a crystalline, white precipitate of anhydrous ammonium chloride is formed. The flask is then cooled to room temperature and the precipitate, also containing unreacted antimony trichlorideamine complex, is separated in a nitrogen atmosphere by centrifuging. The filtrate, containing triallyl antimonite is distilled at atmospheric pressure and under nitrogen at 76.8° to 79° C. to separate the benzene and excess allyl alcohol mixture. The residual of this distillation is a light colored, heavy liquid which hydrolyzes on exposure to the atmosphere. On vacuum distillation of this compound 220 g. (75% of the theoretical amount) of a water-white, heavy liquid is obtained, B.P. 160° C. per 30 mm. Hg. An elemental analysis of this triallyl antimonite, $C_9H_{15}O_3Sb$, gives the following results:

| Element | Actual Percent by Weight | Calculated Percent by Weight |
|---|---|---|
| Carbon | 35.5 | 36.9 |
| Hydrogen | 5.0 | 5.2 |
| Antimony | 41.6 | 41.6 |

EXAMPLE 2

*Preparaiton of tris(2,3-dibromopropyl)antimonite*

To a solution of one mole of triallyl antimonite in methylene chloride is added, with stirring, three moles of bromine at a temperature between −10° C. and +25° C. The solvent is removed under vacuum, leaving the crude product, tris(2,3-dibromopropyl) antimonite, which is used without purification.

EXAMPLE 3

*Preparation of triallyl borate*

A suspension of equimolar amounts of allyl alcohol and boric acid in benzene is heated under reflux; the water formed in the reaction is collected in a Dean and Stark trap. When evolution of water ceases, the benzene is removed by vacuum distillation and the triallyl borate is distilled, B.P. 75° to 77° C. at 12 mm. Hg.

EXAMPLE 4

*Preparation of tris(2,3-dibromopropyl) borate*

To a solution of one mole of triallyl borate in methylene chloride is added, with stirring, three moles of bromine at a temperature between −15° C. and +10° C. The solvent is removed under vacuum, leaving the clear tris(2,3-dibromopropyl) borate which is used without purification.

EXAMPLE 5

*Preparation of tetrallyl silicate*

In a 500-ml., three-necked flask, fitted with a mechanical stirrer, reflux condenser and dropping funnel, are placed a solution of 46.4 g. (0.8 mole) of allyl alcohol and 63.3 g. (0.8 mole) of pyridine in 100 ml. of carbon tetrachloride. The solution is stirred and 34 g. (0.2 mole) of silicon tetrachloride is added at such a rate that the mixture is maintained at gentle reflux. After the addition of the silicon tetrachloride, refluxing is continued for one hour.

The white precipitate of pyridine hydrochloride which is formed during the reaction is filtered and weighed in absence of moisture and found to be 78 g., or 84.5% of the theoretical amount. The solvent is distilled at 74–77° C. Upon vacuum distillation of the product, 43 g. of a clear liquid is obtained, B.P. 119° C./17 mm. Hg. This quantity corresponds to 84.4% of the theoretical amount.

EXAMPLE 6

*Preparation of tetrakis(2,3-dibromopropyl) silicate*

To a solution of 64 g. (0.25 mole) of tetrallyl silicate in 200 ml. of methylene chloride in a 500 ml. flask equipped with a mechanical stirrer, calcium chloride drying tube, thermometer and dropping funnel, is added slowly a solution of 160 g. (one mole) of bromine in 100 ml. of methylene chloride. Because of the exothermic absorption of bromine by the double bond, the flask temperature is maintained at 3° to 5° C. by means of an ice-water bath. All the bromine is rapidly absorbed and a light colored solution is obtained. Stirring is continued for two hours while the temperature is slowly raised to 25°–30° C. Distillation of the solvent is carried out at atmospheric pressure and a light colored compound is obtained which has a viscosity of four stokes at 25° C., boils at 170°–180° C. and decomposes at 200° C.

EXAMPLE 7

*Preparation of tetrakis(2,3-dichloropropyl) silicate*

In a two-liter, three-necked flask equipped with a mechanical stirrer, reflux condenser and gas inlet, is placed a solution of 128 g. (0.5 mole) of tetrallyl silicate in 750 ml. of carbon tetrachloride. While keeping the flask temperature at 3–5° C. by means of an ice bath, a gentle stream of dry chlorine gas is introduced below the surface of the liquid with stirring. The chlorine is rapidly absorbed and, as saturation is reached, an excess of chlorine imparts a yellow color to the solution. The gas influx is then discontinued and the flask temperature is slowly raised to reflux with stirring. A nitrogen sparge is used to rid the solution of the last traces of chlorine gas. A water white solution is obtained from which the solvent is distilled at atmospheric pressure and the product is recovered.

EXAMPLES 8 TO 22

*Part A.—Preparation of polyester laminates*

A polyester is prepared from 2.2 moles of propylene glycol, 1.0 mole of fumaric acid and 1.0 mole of phthalic anhydride. To a 65% solution of this polyester in styrene is added a fireproofing additive as indicated in Table I, after which 0.6% of cumene hydroperoxide and 0.5% of benzoyl peroxide are introduced. A 1½ oz., ⅛-inch thick fiberglass mat is impregnated with the resin solution and cured in an oven at 220° F. for two hours. The appearance of the laminates after curing is shown in Table I, column F.

The following tests are carried out on the laminates prepared by the foregoing method, and also on a standard prepared by the same procedure but containing no additive.

*Part B.—Hardness*

Hardness of the cured laminates is measured with a Barcol impressor. This apparatus gives a reading of 85–87 on an aluminum test coupon and 100 on glass. Readings for the coupons prepared according to Part A are given in column B of Table I.

*Part C.—Solvent extraction*

A weighed 1½-inch section from each of the laminates of Part A is submerged in 100 ml. of refluxing methanol for two hours and then dried at 200° F. for two hours. The dried coupon is again weighed and percentage weight loss is calculated. Column C of Table I shows the results.

*Part D.—Burning rate (ASTM D757)*

A 5½-inch coupon of each laminate is contacted with a Globar heating element at 900° C. for three minutes, according to ASTM method D757–49. The burning rate in inches per minute is reported in Table I, column D.

*Part E.—Burning rate (ASTM D635)*

The laminate used in this test is made by the process described in Part A but is only ⅛₆-inch thick. The procedure is ASTM method D635–56.

A coupon 5 inches long and ½-inch wide is clamped at a 45° inclination from the horizontal and is contacted with a Bunsen flame at 1300±50° F. for thirty seconds. The burning rate in inches per minute is recorded; if no burning takes place after removal of the flame, the sample is reported as non-burning. Results of this test are given in Table I, column E.

EXAMPLES 21–22

A "high unsaturation" polyester is prepared from 2.2 moles of propylene glycol, 1.33 moles of fumaric acid and 0.67 mole of phthalic anhydride. To a 70% solution of this polyester in styrene is added a fireproofing additive and the tests described hereinabove are performed. Results are given in Table I.

It is to be understood that while the invention has been described with particular reference to specific embodi-

TABLE I

| Example | A Additive | Percent | B Hardness | C Extraction | D Burning (D757) | E Burning (D635) | F Appearance |
|---|---|---|---|---|---|---|---|
| 8 | None (control) | | 45–49 | 0.07 | 0.72 | | Transparent. |
| 9 | Tris(2,3-dibromopropyl)antimonite | 10 | 35 | 1.80 | 0.500 | 0.5 | Light yellow, transparent. |
| 10 | Tris(2,3-dibromopropyl)borate | 10 | 51 | 0.48 | 0.42 | | Transparent. |
| 11 | Tris(2,3-dibromopropyl)borate | 20 | 39 | 0.75 | 0.36 | 0.48 | Do. |
| 12 | Tris(2,3-dibromopropyl)borate | 25 | 35 | | 0.33 | Non-burning | Do. |
| 13 | Tris(2,3-dibromopropyl)borate | 30 | 35 | | 0.16 | Non-burning | Do. |
| 14 | Tetrakis(2,3-dibromopropyl)silicate | 10 | 50 | 0.45 | 0.45 | | Do. |
| 15 | Tetrakis(2,3-dibromopropyl)silicate | 20 | 36 | | 0.33 | 0.6 | Do. |
| 16 | Tetrakis(2,3-dichloropropyl)silicate | 10 | 45 | 0 | 0.55 | Non-burning | Do. |
| 17 | Tetrakis(2,3-dichloropropyl)silicate | 20 | 30 | | 0.36 | | Do. |
| 18* | Tris(2,3-dichloropropyl)antimonite | 10 | 36 | 1.20 | 0.574 | | Do. |
| 19* | Tris(n-octyl)antimonite | 10 | 15 | 1.05 | 0.77 | | Opaque. |
| 20* | Tris(n-octoxy)antimony dibromide | 10 | 0 | 11.9 | 0.605 | | Yellow, non-transparent. |
| 21* | Antimony cinnamate | 10 | 38 | 1.7 | 0.69 | | Transparent. |
| 22 | None (control) | | 53 | | 0.75 | | Do. |

*Prior art additive.

ments thereof, it is not to be so limited, since changes and modifications therein may be made which are within the full intended scope of the invention as defined in the appended claims.

What is claimed is:

1. A fire-resistant, curable polyester composition which comprises:
   (A) About 30–83% by weight of the reaction product of (1) about 2.0–2.5 molar parts of at least one aliphatic polyhydroxy compound, (2) about .4–2.0 molar parts of a compound selected from the group consisting of dibasic carboxylic acids containing a polymerizable double bond and anhydrides thereof, and (3) about 0–1.6 molar parts of a compound selected from the group consisting of non-polymerizable dibasic carboxylic acids and anhydrides thereof;

(B) About 15–68% by weight of a solvent for said reaction product (A), said solvent comprising a monovinyl aromatic compound; and (C) As a fire-retardant additive, about 2–30% by weight of a compound selected from the group consisting of tetrakis (2,3-dibromopropyl) silicate and tetrakis (2,3-dichloropropyl) silicate.

2. The polyester composition of claim 1 wherein the fire-retardant additive (C) is tetrakis (2,3-dibromopropyl) silicate.

3. The polyester composition of claim 1 wherein the fire-retardant additive (C) is tetrakis (2,3-dichloropropyl) silicate.

References Cited

UNITED STATES PATENTS

| 2,532,498 | 12/1950 | Hoppens | 260—75 |
| 3,031,425 | 4/1962 | Schoepfle | 260—28.5 |
| 3,189,565 | 6/1965 | Woods et al. | 260—2.5 |

FOREIGN PATENTS

| 825,611 | 12/1959 | Great Britain. |
| 951,516 | 3/1964 | Great Britain. |

MORRIS LIEBMAN, *Primary Examiner.*

A. HOLTZ, H. S. KAPLAN, *Assistant Examiners.*